US012626838B2

(12) United States Patent
Cummings

(10) Patent No.: US 12,626,838 B2
(45) Date of Patent: May 12, 2026

(54) DEPLOYING ELECTRIC FIELDS

(71) Applicant: SCANNA MSC LIMITED, London (GB)

(72) Inventor: Noel Samuel Cummings, London (GB)

(73) Assignee: SCANNA MSC LIMITED, London (GB)

( * ) Notice: Subject to any disclaimer, the term of this patent is extended or adjusted under 35 U.S.C. 154(b) by 182 days.

(21) Appl. No.: 18/780,394

(22) Filed: Jul. 22, 2024

(65) Prior Publication Data

US 2025/0037901 A1 Jan. 30, 2025

(30) Foreign Application Priority Data

Jul. 25, 2023 (GB) ...................................... 2311406

(51) Int. Cl.
H01B 5/14 (2006.01)
G01N 27/02 (2006.01)

(52) U.S. Cl.
CPC ............. H01B 5/14 (2013.01); G01N 27/028 (2013.01)

(58) Field of Classification Search
CPC ................................ H01B 5/14; G01N 27/028
USPC ......................................................... 324/649
See application file for complete search history.

(56) References Cited

U.S. PATENT DOCUMENTS

| | | |
|---|---|---|
| 8,994,383 B2 | 3/2015 | Mamigonians |
| 10,753,898 B2 | 8/2020 | Mamigonians |

| | | | |
|---|---|---|---|
| 2014/0118635 A1 | 5/2014 | Yang | |
| 2019/0170676 A1* | 6/2019 | Mamigonians ...... | G01N 27/228 |
| 2019/0220117 A1* | 7/2019 | Yamai ..................... | G06F 3/041 |
| 2022/0308702 A1 | 9/2022 | Wang et al. | |

FOREIGN PATENT DOCUMENTS

| | | | |
|---|---|---|---|
| GB | 2583731 A | 11/2020 | |

OTHER PUBLICATIONS

Corresponding Great Britain Application No. GB2311406.9, Search Report, dated Dec. 27, 2023, 1 page.
Corresponding Great Britain Application No. GB2410131.3, European Search Report, dated Jan. 5, 2025, 1 pages.
Corresponding European Application No. EP24189365, European Search Report, dated Nov. 15, 2024, 1 pages.

* cited by examiner

*Primary Examiner* — Stephanie E Bloss
*Assistant Examiner* — Michael A Harrison
(74) *Attorney, Agent, or Firm* — Cooper Legal Group LLC

(57) ABSTRACT

Electric fields are deployed to determine electrical characteristics of an object. A dielectric substrate has a first surface and a second surface, a first set of substantially parallel electrodes are located on said first surface and a second set of substantially parallel electrodes are located on the first surface. The second set is substantially orthogonal to said first set thereby defining electrode crossings. Discontinuities are formed in an electrode at each electrode crossing to electrically isolate electrodes of the first set from electrodes of the second set. An electric bridge is created at each discontinuity to maintain electrical continuity. A selected electrode of the first set is energized two or more times while sequentially monitoring remaining electrodes of said first set. This is followed by energizing a selected electrode of the second set two or more times while sequentially monitoring remaining electrodes of the second set.

20 Claims, 18 Drawing Sheets

DEPLOYING ELECTRIC FIELDS

CROSS REFERENCE TO RELATED APPLICATIONS

This application claims priority from United Kingdom Patent Application number 2311406.9, filed on Jul. 25, 2023 the whole contents of which are incorporated herein by reference.

TECHNICAL FIELD

The present invention relates to an apparatus and a method for deploying electric fields and, in particular, to deploying electric fields to determine electrical characteristics of an object.

BACKGROUND OF THE INVENTION

The sensing of the electrical permittivity of an object is disclosed in U.S. Pat. No. 8,994,383. A sensor is described that includes a dielectric layer that presents a surface defining the base of a volume in which a test object may be placed and an electrically active layer beneath the dielectric layer, comprising a first set of electrodes that extend in a first direction and a second set of electrodes that extend in a second direction that is perpendicular to the first direction. The electrodes are electrically isolated by deploying the first set on the first surface of the dielectric material and the second set on the second surface of the dielectric material.

By selecting one of the sets, energizing a selected electrode of that set and monitoring one of the remaining electrodes of that set, data may be obtained relating to the permittivity of the material. A similar operation may be repeated during which the same electrode is energized but a different electrode is selected to be monitored; such that resulting electric fields penetrate the object to a greater or a lesser degree compared to the first iteration.

As described in U.S. Pat. No. 10,753,898, an object can be scanned by an external electric field by placing the object on a support platform. A dielectric membrane in proximity to the support platform may include input lines and output lines, and a strobing circuit may apply input voltages to the input lines while a sampling circuit receives output voltages from the output lines.

A processing device compares selected output signals against a reference signal to produce voltage control data. A voltage adjustment circuit adjusts the input voltage from a first intensity to a second intensity in response to the voltage control data. Apparatus of this type may be deployed as a security device for scanning the shoes worn by passengers before they board an aircraft for example.

Scanning may be performed using the first set of electrodes on the first surface of the dielectric material, followed by using the second set of electrodes mounted on the second surface of the dielectric material. However, experiment has shown that the results obtained from the two scanning procedures are different. In applications such as shoe scanning, this can create difficulties in terms of identifying the data that is actually correct. Furthermore, problems may arise in terms of adjusting input voltages if different scanning procedures are producing different results.

A known printed circuit board A1 of a dielectric material is shown in FIG. 1. On the first surface of the circuit board A1, material has been etched away to reveal a first array of electrodes A11 to A18. Electrodes are also etched on an underside second face of board A1, identified as A19.

Surface A19 is also shown in FIG. 1. This includes a second array of electrodes A21 to A28. The second set of electrodes A21 to A28 is substantially orthogonal to the first set of electrodes A11 to A18.

This arrangement may be used for two-dimensional scanning, during which a selected electrode of the first set is energized and a selected electrode of the second set is monitored. This procedure is repeated for all possible electrode combinations and the results obtained may be used to present an image of an object that is being scanned. As is known in the art, this technique may be used for scanning many different objects and the present inventor has performed experiments in relation to the scanning of shoes, as worn by passengers about to enter an aircraft or other protected area, for example.

In order to gain a better understanding of the material composition of the object under investigation, is also known to perform layering procedures with respect to a single array of electrodes. Thus, layering may be performed with respect to the first set of electrodes A11 to A18 and then repeated with respect to the second set of electrodes A21 to A28.

A cross section of the first set of electrodes A11 to A18 is shown in FIG. 2, when performing a layering operation. The electrodes are mounted on the board A1 and a ground plane B1 is present to shield the device from external electrical noise. During a layering procedure, it is possible for the first electrode A1 to be energized and the second electrode A12 to be monitored. On the next cycle, the first electrode A11 is again energized but this time the third electrode A13 is monitored. This is followed by the first electrode A11 being energized again with the fourth electrode A14 being monitored. Thereafter, the first electrode A11 is energized and the fifth electrode A15 is monitored. As shown in FIG. 2, as the distance between the electrodes increases, the depth of penetration into the material under examination also increases.

With the object remaining in position, a similar procedure may be performed with respect to the second set of electrodes A21 to A28. Thus, again, the first electrode of the second set A21 is energized with the second electrode A22 being monitored. The procedure is repeated with a third electrode A23 being monitored, then the fourth electrode A24 being monitored and the fifth electrode A25 being monitored. Again, as the distance between the energized electrode and the monitored electrode increases, the depth of penetration also increases.

However, a problem has been identified, in that electric fields generated as a result of energizing the second set of electrodes A21 to A28 are somewhat attenuated compared to the electric fields generated by the first set of electrodes A11 to A18. As can be seen from FIG. 2, this situation can be appreciated, given that the electric fields generated by the second set of electrodes will be attracted more towards the ground plane B1 and the electric fields must also penetrate the width of the board A1.

Experiments have also shown that this difference has a greater effect when the voltage of the energizing electrode increases. Thus, when scanning shoes for example, it may be necessary to deploy substantially higher voltages and, in some embodiments, voltages may be increased adaptively to optimize the level of penetration. However, given the configuration described with reference to FIG. 1 and FIG. 2, this optimization can only occur with respect to the first set of electrodes A11 to A18 or with respect to the second set of electrodes A21 to A28.

BRIEF SUMMARY OF THE INVENTION

According to a first aspect of the present invention, there is provided an apparatus for deploying electric fields to determine electrical characteristics of an object, comprising: a dielectric substrate having a first surface and a second surface; a first set of substantially parallel electrodes on said dielectric substrate; a second set of substantially parallel electrodes also on said dielectric substrate, wherein said second set of substantially parallel electrodes is substantially orthogonal to said first set of substantially parallel electrodes; first devices for energizing a selected electrode of said first set of substantially parallel electrodes two or more times and sequentially monitoring two or more remaining electrodes of said first set of substantially parallel electrodes; second devices for sequentially energizing a selected electrode of said second set of substantially parallel electrodes two or more times and sequentially monitoring two or more remaining electrodes of said second set of substantially parallel electrodes; wherein: said first set of substantially parallel electrodes are mounted on said first surface of said dielectric substrate; said second set of substantially parallel electrodes are also mounted on said first surface, thereby defining electrode crossings; discontinuities are formed in an electrode at each said electrode crossing to electrically isolate electrodes of said first set from electrodes of said second set; and an electric bridge is created at each said discontinuity, that extends away from the plane of the first surface, to maintain electrical conductivity.

In an embodiment, the dielectric substrate is a board and said electrodes are established on said board by an etching process. Alternatively, the dielectric substrate may be flexible.

In an embodiment, said electric bridge is a wire that physically passes over a continuous electrode at an electrode crossing. In an alternative embodiment, each electric bridge is formed by a respective bridge conductor on the second surface of the dielectric substrate and electrical contacts pass through the dielectric substrate, each connecting an end of a discontinuous electrode to an end of a bridge conductor.

In an embodiment, each electrode track has a normal width defining a track footprint on the dielectric substrate; and each continuous electrode at each electrode crossing has a reduced width to reveal an uncovered region of the track footprint, such that an end of a discontinuous electrodes may extend into one of said uncovered regions of a track footprint. The reduced width may define uncovered regions of track footprints with trapezoidal shapes and an end of a discontinuous electrode may have a trapezoidal shape.

According to a second aspect of the present invention, there is provided a method of deploying electric fields to determine electrical characteristics of an object, in which: a dielectric substrate has a first surface and a second surface; a first set of substantially parallel electrodes are located on said first surface; a second set of substantially parallel electrodes are also located on said first surface, wherein said second set of substantially parallel electrodes is substantially orthogonal to said first set of substantially parallel electrodes thereby defining electrode crossings; discontinuities are formed in an electrode at each said electrode crossing to electrically isolate electrodes of the first set from electrodes of the second set; and an electric bridge is created at each said discontinuity, that extends away from the plane of the first surface, to maintain electrical continuity, comprising the steps of: energizing a selected electrode of said first set of substantially parallel electrodes two or more times and sequentially monitoring two or more remaining electrodes of said first set of substantially parallel electrodes; and energizing a selected electrode of said second set of substantially parallel electrodes two or more times and sequentially monitoring two or more remaining electrodes of said second set of substantially parallel electrodes.

In an embodiment, a plurality of electrodes of the first set of substantially parallel electrodes are selected and sequentially energized. Thereafter, a plurality of the remaining electrodes of the first set of substantially parallel electrodes are sequentially monitored in response to respective energizations of an additional energizing electrode, to produce respective output signals. In addition, a plurality of electrodes of the second set of substantially parallel electrodes may be sequentially selected and energized. Thereafter, a plurality of the remaining electrodes of said second set of substantially parallel electrodes may be monitored in response to respective energizations of an additional energizing electrode, to produce respective output signals.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 3

Figure 3:
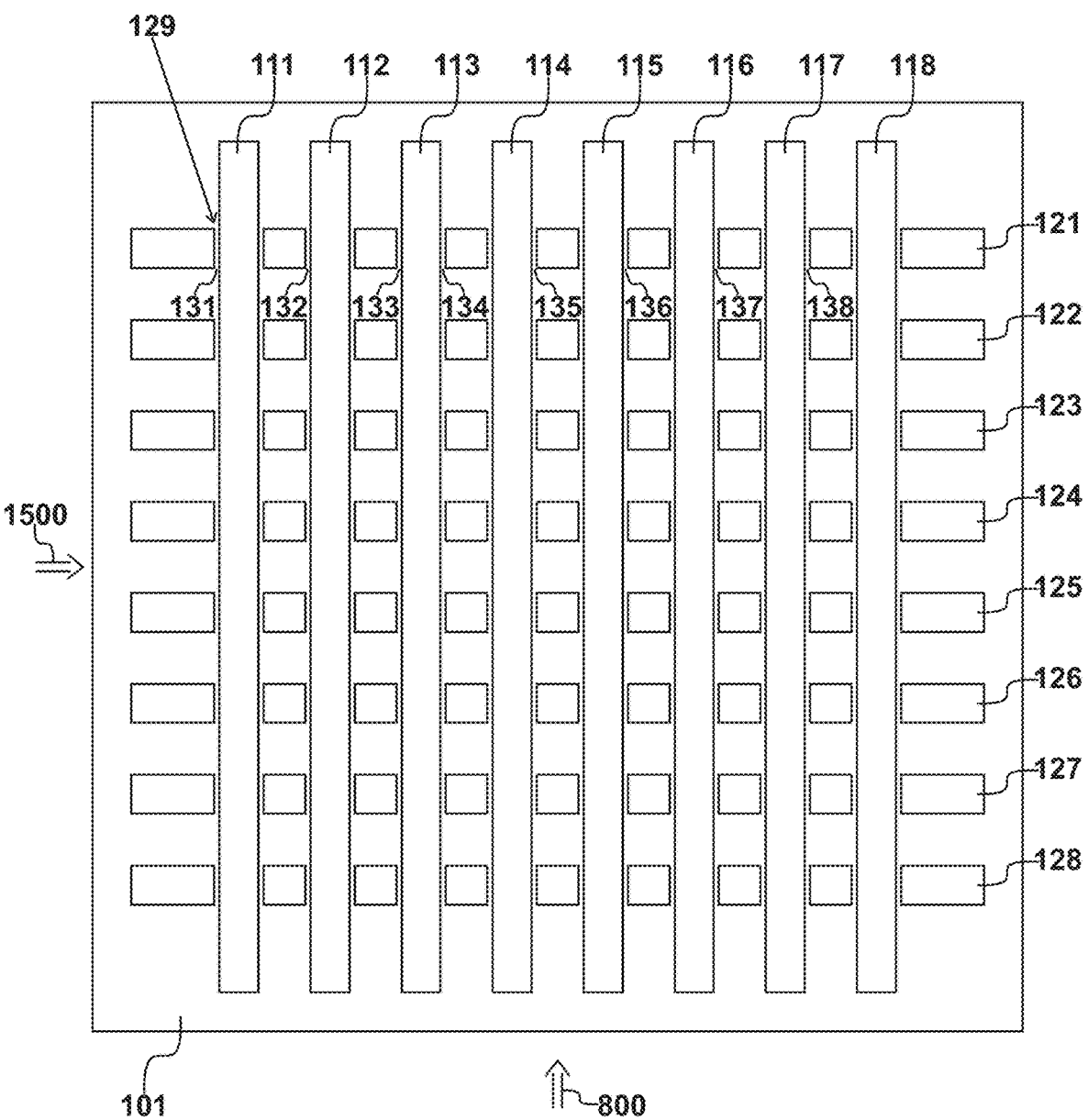
FIG. 3 shows an apparatus for deploying electric fields to determine electrical characteristics of an object.

An apparatus for deploying electric fields to determine electrical characteristics of an object is shown in FIG. 3. The apparatus includes a dielectric substrate 101 that has a first surface, as shown in FIG. 3 and a second surface obscured in FIG. 3.

The apparatus has a first set of substantially parallel electrodes on the first surface. The number of electrodes present will depend upon the particular application and may typically comprise four, eight or sixteen electrodes. In the embodiment shown in FIG. 3, the first set of substantially parallel electrodes consists of eight electrodes 111 to 118.

Figure 1:
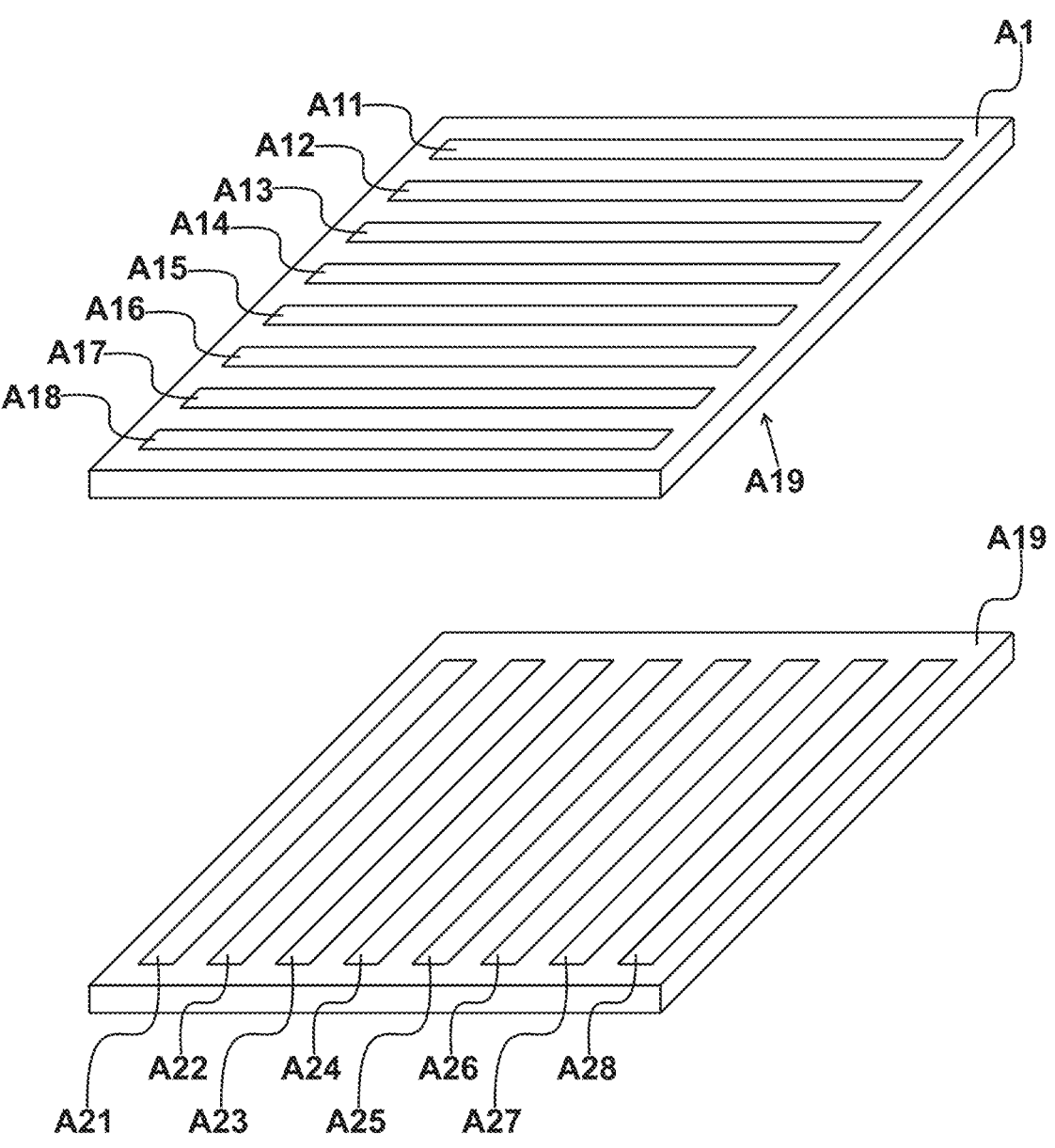
FIG. 1 shows a conventional printed circuit board with a first array of electrodes and a second array of electrodes.
Figure 2:
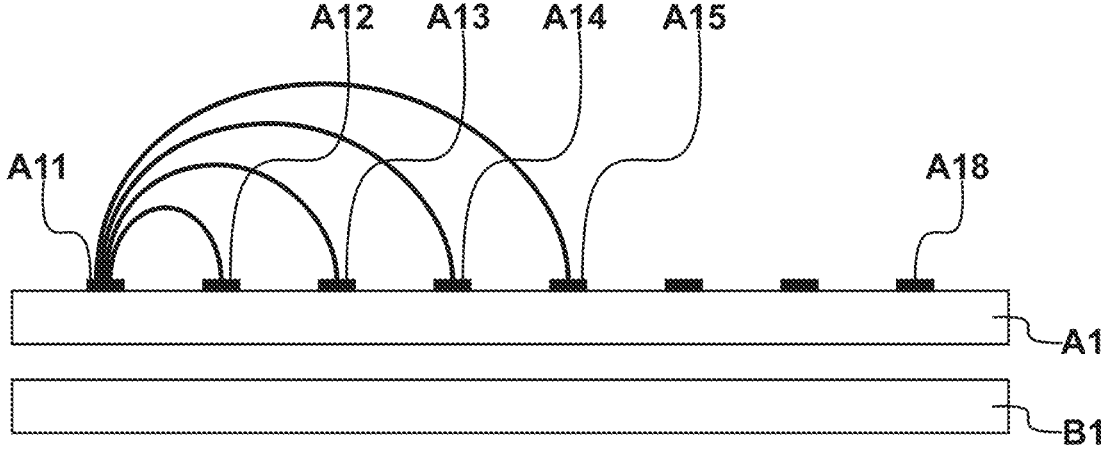
FIG. 2 shows a cross section view of a conventional first set of electrodes and a conventional second set of electrodes when performing layering operations.
Figure 2:
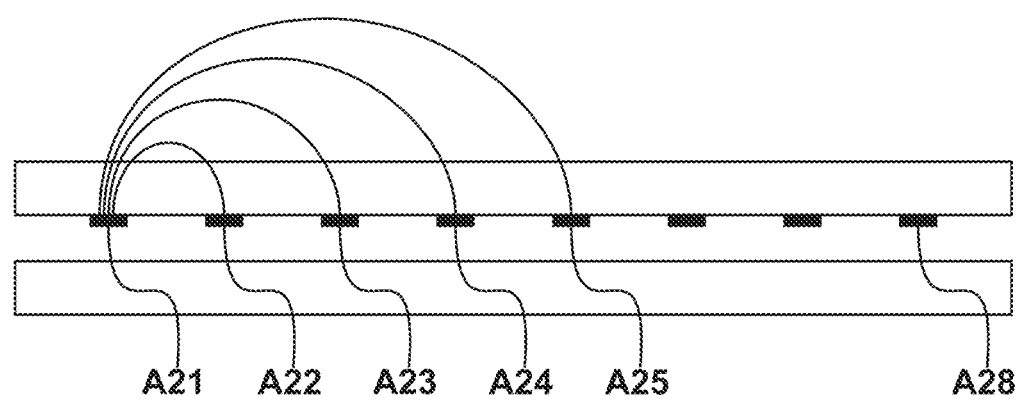

The apparatus also includes a second set of substantially parallel electrodes, in an arrangement similar to that described with reference to FIG. 1 and FIG. 2. However, in the embodiment of FIG. 3, the second set of substantially parallel electrodes is also on the first surface of the dielectric substrate 101. In this embodiment, the second set of substantially parallel electrodes also includes eight electrodes 121 to 128.

As shown in FIG. 3, the second set of substantially parallel electrodes (121 to 128) is substantially orthogonal to the first set of substantially parallel electrodes (111 to 118), thereby defining electrode crossings, such as crossing 129, where the first electrode 121 of the second set crosses the first electrode 111 of the first set. To allow this configuration to operate, discontinuities are formed in an electrode at each crossing, to isolate an electrode of the first set from an electrode of the second set. Thus, in the embodiment of FIG. 3, the first electrode 121 of the second array has a first discontinuity 131, followed by a second discontinuity 132, a third discontinuity 133, a fourth discontinuity 134, a fifth discontinuity 135, a sixth discontinuity 136 a seventh discontinuity 137 and an eighth discontinuity 138. To allow electrical connectivity to be maintained, an electric bridge is created at each discontinuity that extends away from the plane of the first surface; as described with reference to FIG. 4 and with reference to FIG. 5 and FIG. 6.

The dielectric substrate 101 may take the form of a board and the electrodes may be established on the board by an etching process. Alternatively, the dielectric substrate 101 may be made of a flexible acetate, having a thickness substantially less than that of a conventional printed circuit board.

The choice of dielectric material will depend upon the mechanical constraints presented within a particular application. When scanning shoes, a solid circuit board is preferred given that, when deployed, the apparatus will have to withstand the application of significant forces. In these environments, the problem described with reference to FIG. 1 and FIG. 2 becomes more pronounced and the deployment of the invention creates significant advantages.

FIG. 4

Figure 4:
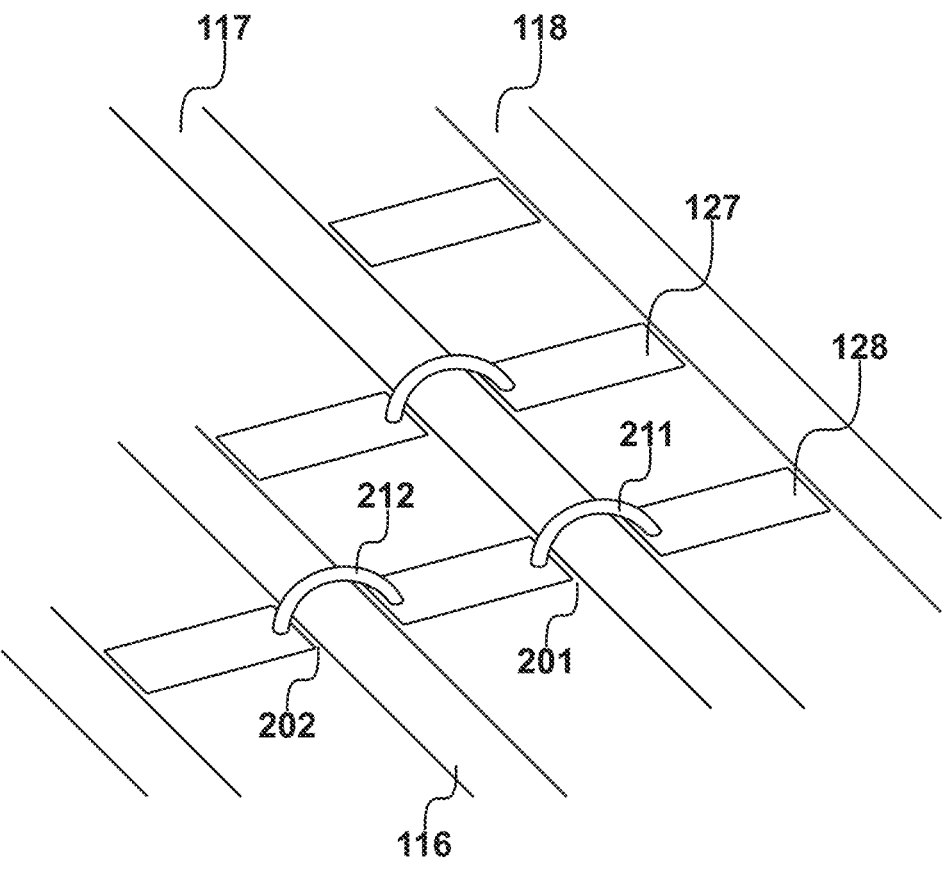
FIG. 4 shows a first embodiment of electric bridges.

The sixth electrode 116, the seventh electrode 117 and the eighth electrode 118 of the first set of substantially parallel electrodes are shown in FIG. 4. These are continuous electrodes and, in an embodiment, all of the discontinuities are present in the second set of electrodes. However, this arrangement is not essential and each electrode crossing may be considered independently.

In the example shown in FIG. 4, the eighth electrode 128 of the second set has a first discontinuity 201 and a second discontinuity 202. An electric bridge is created at each discontinuity that extends away from the plane of the first surface to maintain electrical conductivity.

In the embodiment of FIG. 4, each bridge takes the form of a wire, such that a first wire 211 is present at the first discontinuity 201, with a second wire 212 being present at the second discontinuity 202. Thus, the wire physically passes over the continuous electrode at the crossing, with the first wire 211 passing over the seventh electrode 117 of the first set and the second wire 212 passing over the sixth electrode 116 of the first set.

FIG. 5

Figure 5:
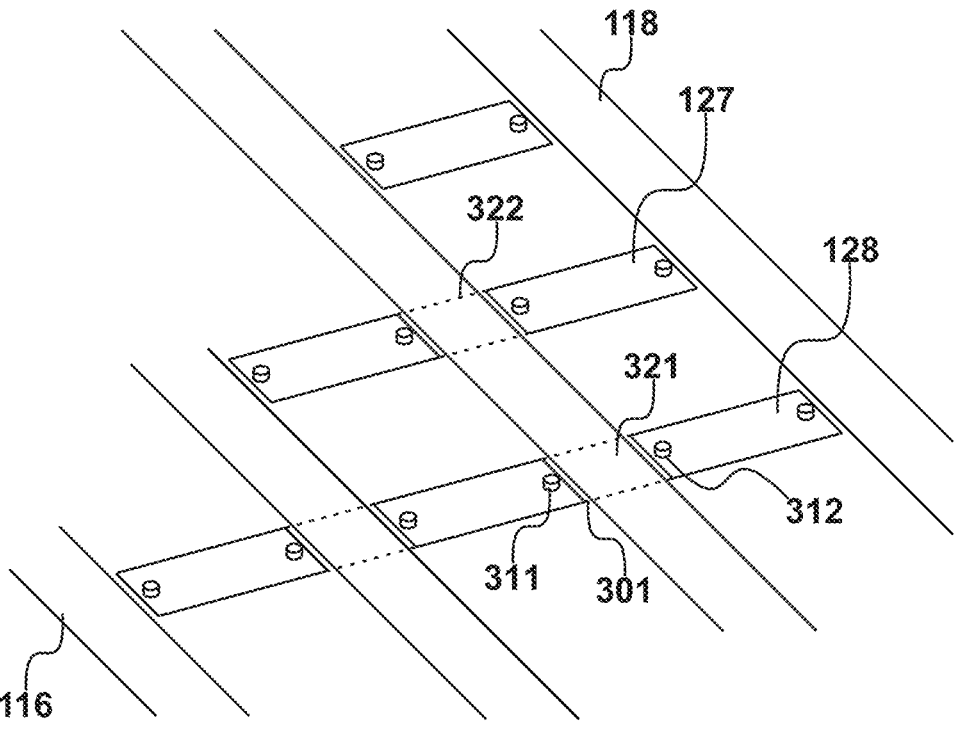
FIG. 5 shows an alternative embodiment for providing electric bridges.

An alternative embodiment is shown in FIG. 5, in which each bridge is formed by a respective conductor on the second surface of the dielectric board and electrical conductors pass through the dielectric substrate connecting ends of respective discontinuous electrodes. Thus, the eighth electrode 128 of the second array has a discontinuity 301. At discontinuity 301, a first conductor 311 and a second conductor 312 penetrate the board 101 so as to emerge on the second surface of the board.

Conductive tracks, comprising a first conductive track 321 and a second conductive track 322, are etched on the second surface of the board; in a manner substantially similar to that described with reference to FIG. 1.

FIG. 6

Figure 6:
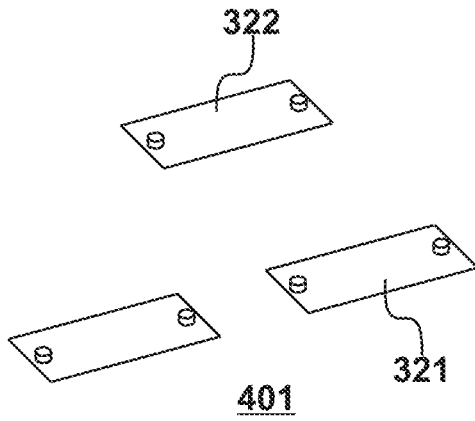
FIG. 6 details the electric bridges identified in FIG. 5.

The second surface 401 of the board 101 is shown in FIG. 6. This shows the first conductive track 321 and the second conductive track 322 providing a bridge for the seventh electrode 127 and the eighth electrode 128 of the second set respectively.

FIG. 7

Figure 7:
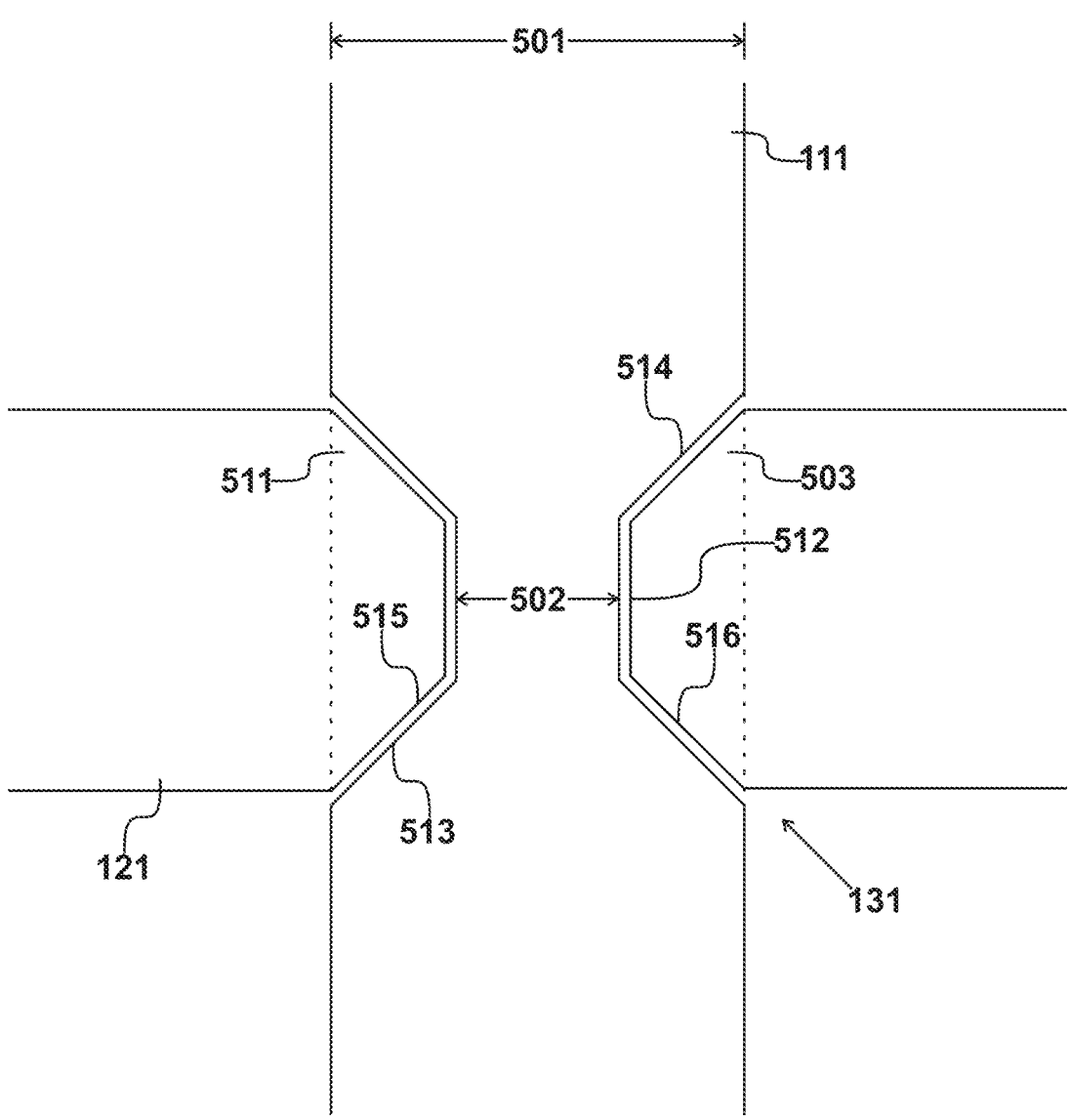
FIG. 7 shows an alternative embodiment with electrodes of reduced width at the positions of discontinuities.

A further embodiment is illustrated in FIG. 7, in which each electrode, such as the first electrode 111 of the first set, has a normal width 501 defining a track footprint on the substrate 101. However, at each discontinuity, such as at the first discontinuity 131, the continuous electrode 111 has a reduced width 502 to reveal an uncovered region 503 of the track footprint.

In the embodiment of FIG. 7, the ends of the discontinuous electrodes extend into the uncovered regions 503 of the track footprints. Thus, in the embodiment of FIG. 7, the first discontinuous electrode 121 has a first end 511 and a second end 512. These ends (511, 512) extend into the uncovered regions 503 of the track footprints.

In the embodiment of FIG. 7, the reduced width of the continuous electrode defines uncovered regions of the track footprints that are substantially trapezoidal in shape, as shown at 513 and 514. Similarly, in the embodiment of FIG. 7, the ends of the discontinuous electrodes (501, 512) also have a trapezoidal shape, as illustrated at 515 and 516.

FIG. 8

Figure 8:
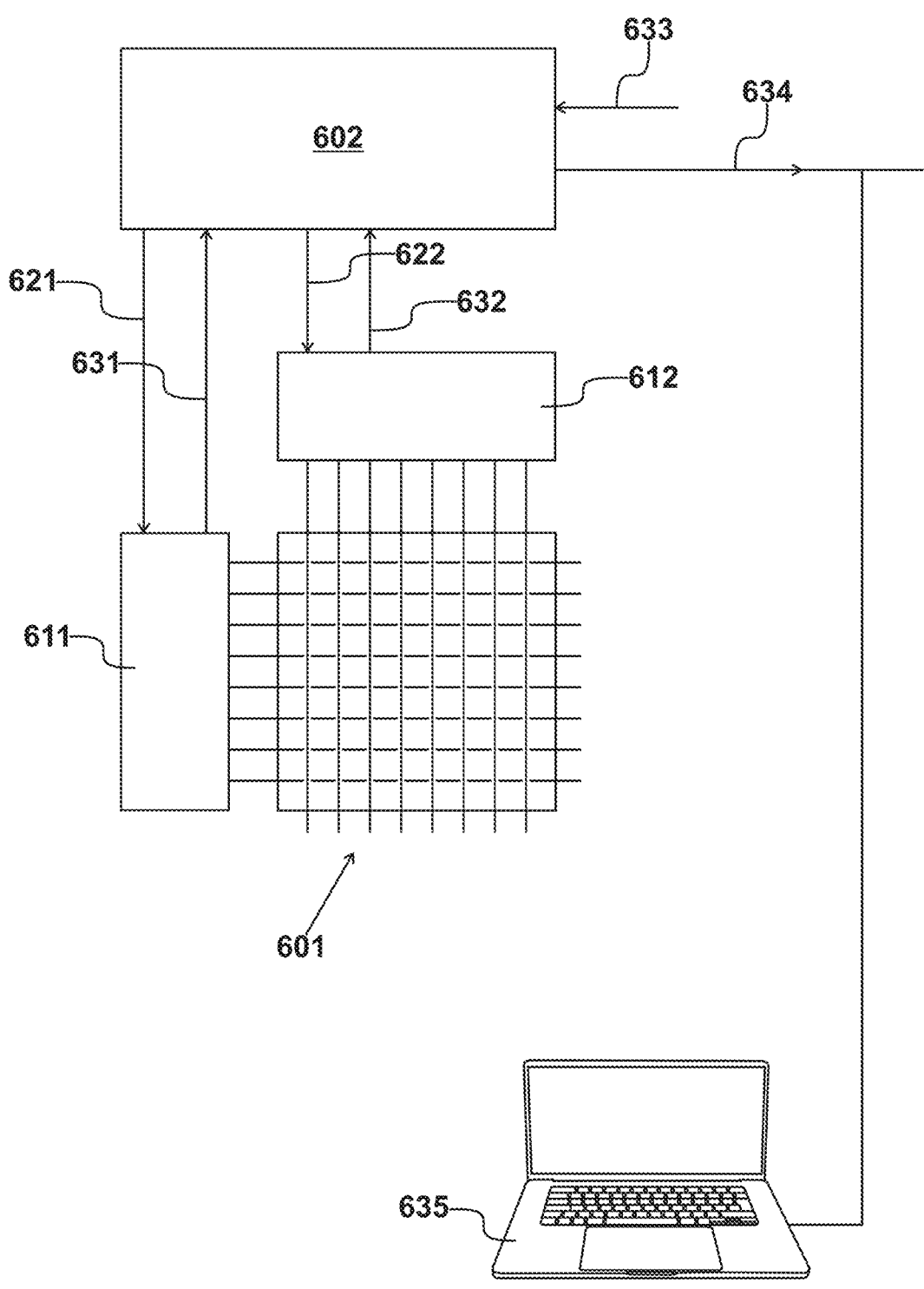
FIG. 8 shows an environment for deploying electric fields to determine electrical characteristics of an object.

A method of deploying electric fields to determine electrical characteristics of an object may be achieved within an environment such as that shown in FIG. 8. The method comprises the steps of energizing selected electrodes and monitoring remaining electrodes. An apparatus 601 is provided in a form substantially similar to that described with reference to FIG. 3 to FIG. 7. Thus, there is a dielectric substrate that has a first surface and a second surface, a first set of substantially parallel electrodes present on the first surface, and a second set of substantially parallel electrodes also present on the first surface.

The second set of substantially parallel electrodes is substantially orthogonal to the first set of substantially parallel electrodes, thereby defining electrode crossings. Discontinuities are formed in an electrode at each crossing, to isolate an electrode of the first set from an electrode of the second set. Furthermore, an electric bridge is created at each discontinuity that extends away from the plane of the first surface to maintain electrical conductivity.

In the embodiment of FIG. 8, a processing circuit 602 communicates with the apparatus 601 via a first multiplexer 611 and a second multiplexer 612. A first energizing line 621 supplies energizing signals to selected electrodes of the first set, and a second energizing line 622 supplies energizing signals to selected electrodes of the second set. Similarly, a first monitoring line 631 receives monitored output signals from a selected electrode of the first set, and a second monitoring line 632 receives monitored signals from a selected electrode of the second set. Thus, in this configuration, any electrode may be selected as an energized input electrode and any of the remaining electrodes may be selected as a monitored output electrode.

A power line 633 supplies power to the processing circuit 602. Output signals from the processing circuit 602 are supplied on an output line 634, allowing data to be analysed further by a laptop computer 635 or similar data processing device.

FIG. 9

Figure 9:
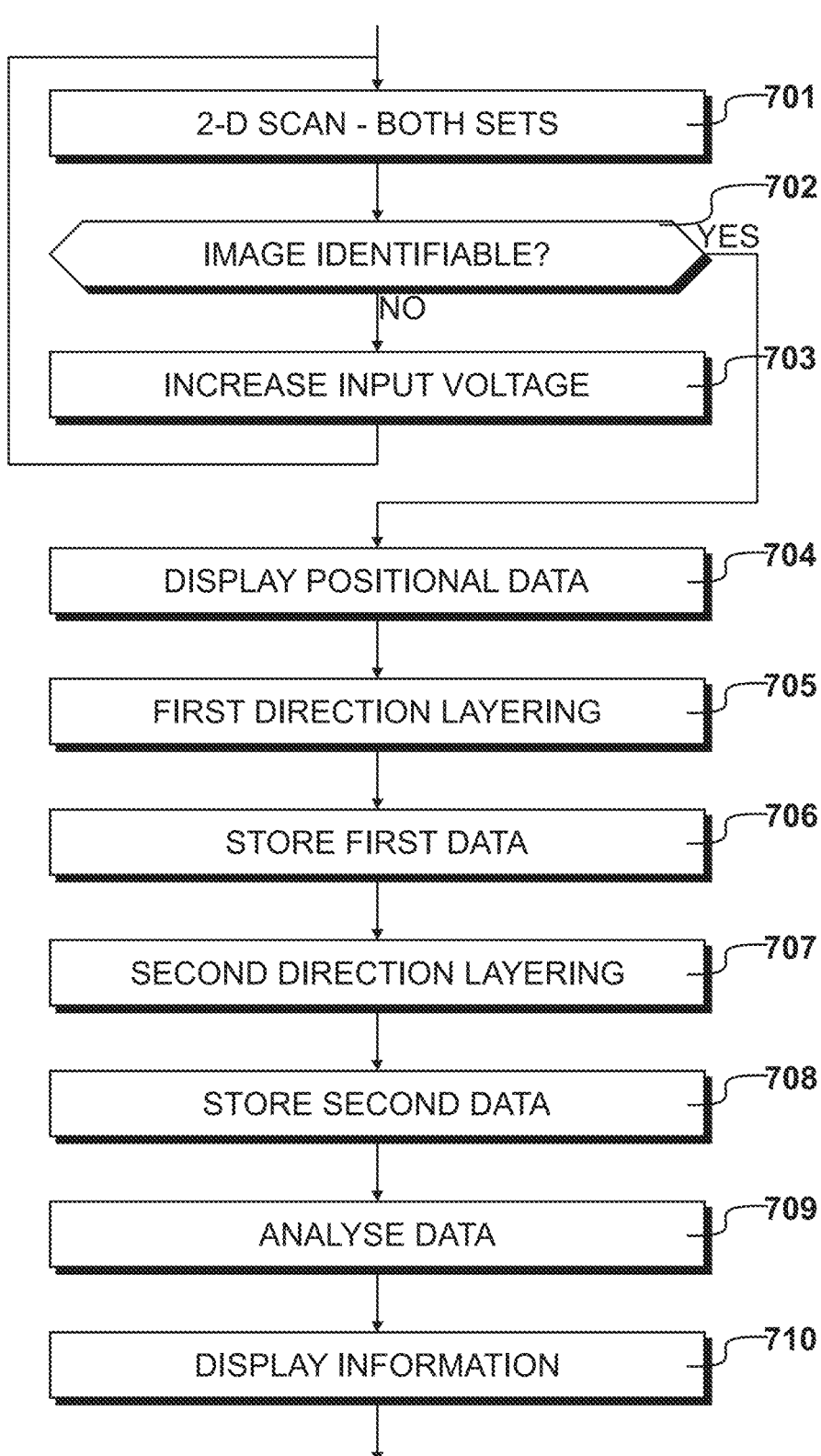
FIG. 9 shows procedures performed within the environment of FIG. 8.

Procedures performed by the environment described with reference to FIG. 8 are shown in FIG. 9. After an object has been placed on the apparatus, a two-dimensional scanning operation is performed at step 701 involving both sets of electrodes. Thus, an electrode of the first set is energized and an electrode of the second set is monitored. This procedure is then repeated until all possible combinations of electrodes have been considered.

In the embodiment of FIG. 9, a question is asked at step 702 as to whether an image is identifiable. If this question is answered in the negative, it is assumed that the energizing input voltage is insufficient and therefore the input voltage is increased at step 703. The process is then repeated until the question asked at step 702 is answered in the affirmative; or a maximum energizing voltage level is reached.

In response to identifying image data at step 702, positional data is displayed at step 704. Thus, in an embodiment, a graphical image of the shape of the object placed on the apparatus is displayed to an operative via the laptop computer 635.

At step 705, first direction layering is performed of the type described with reference to FIG. 2. The resulting data is stored at step 706, whereafter second direction layering is performed at step 707. The second direction layering is substantially similar to that described with reference to FIG. 2 but, on this occasion, using the second set of electrodes that are also present on the first upper surface of the dielectric substrate. In this way, the layering procedures performed at step 707 provides data that is substantially similar to the data obtained from the first direction layering procedures performed at step 705.

At step 708, the data derived from the second direction layering is again stored and an analysis of the stored data is performed at step 709. This analysis may be performed by the processing circuit 602 or the analysis may be performed by the laptop computer 635. It will also be appreciated that a further degree of analysis may take place at a remote location.

At step 710, information derived from the analysis step is displayed on the laptop computer 635.

The apparatus may be deployed for scanning shoes to identify suspicious material. Steps 701 to 703 ensure that a sufficient degree of penetration is being achieved in order for any suspicious material to be detected if suspicious material is present. The two-dimensional scan performed at step 701 also provides a graphical image of the outline of the shoe, which can then be overlaid with the content information derived from the layering operations.

FIG. 10

Figure 10:
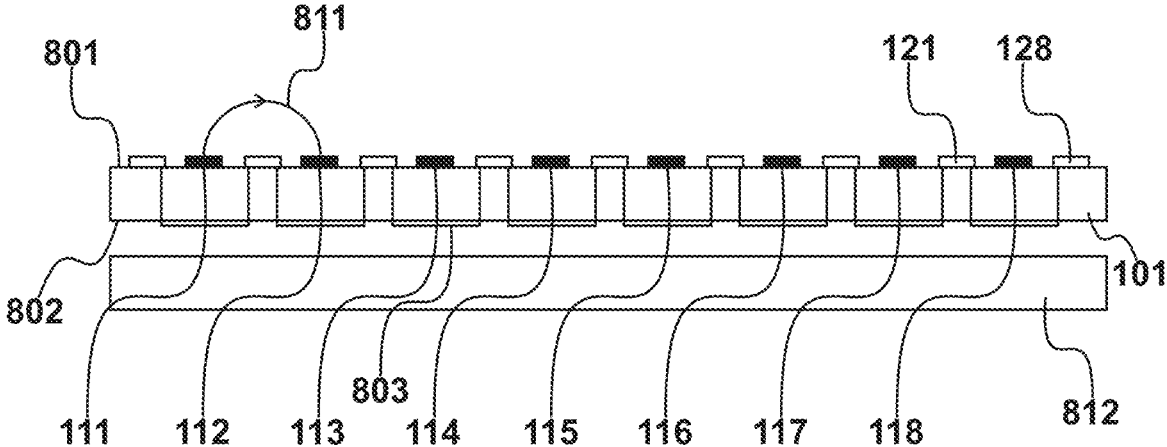
FIG. 10 shows an end view of the dielectric substrate and an energization of a first electrode of a first set of substantially parallel electrodes.

An end view of the dielectric substrate 101 is shown in FIG. 10, when viewed in the direction of arrow 800 identified in FIG. 3. One-dimensional scanning, to achieve layering, is to be performed in a manner substantially similar to that described with reference to FIG. 2. This facilitates a method of deploying electric fields to determine electrical characteristics of an object.

The dielectric substrate 101 has a first surface 801 and a second surface 802. The first set of substantially parallel electrodes (111-118) are located on the first surface. In this example, the first set of substantially parallel electrodes consists of eight electrodes. In alternative embodiments, fewer electrodes or more electrodes may be included to form the first set. A second set of substantially parallel electrodes are also located on the first surface, wherein the second set of electrodes is substantially orthogonal to the first set of parallel electrodes thereby defining electrode crossings. In this embodiment, the second set of electrodes also comprises a total of eight electrodes identified as 121 to 128 as shown in FIG. 3.

In the view of FIG. 10, the first electrode 121 of the second set is visible. In this embodiment, electrodes of the second set include discontinuities at each electrode crossing to electrically isolate electrodes of the first set from electrodes of the second set. An electric bridge, such as bridge 803, is created at each discontinuity such as that created by the presence of electrode 113. The bridge extends away from the plane of the first surface to maintain electrical continuity. A selected electrode of the first set is energized two or more times and two or more remaining electrodes of the first set are sequentially monitored. Subsequently, a selected electrode of the second set is energized two or more times and two or more remaining electrodes of the second set are sequentially monitored.

Any of the available electrodes may be selected to be energized and any of the remaining electrodes may be monitored. In the example shown in FIG. 10, this process is initiated by selecting the first electrode 111 to be energized two or more times. In this way, layering is performed because when the monitored electrode is further away from the energizing electrode the resulting electric field penetrates further into the object for which electrical characteristics are being determined. Thus, in an embodiment, this allows the electric fields to penetrate further into a shoe to determine electrical characteristics of the shoe which in turn may be interpreted to reveal the existence of prohibited matter. Thus, in the example of FIG. 10, the first electrode 111 of the first set is energized and the second electrode 112 is monitored resulting in the generation of a first electric field 811. The embodiment shown in FIG. 10 also includes a ground plane 812.

FIG. 11

Figure 11:
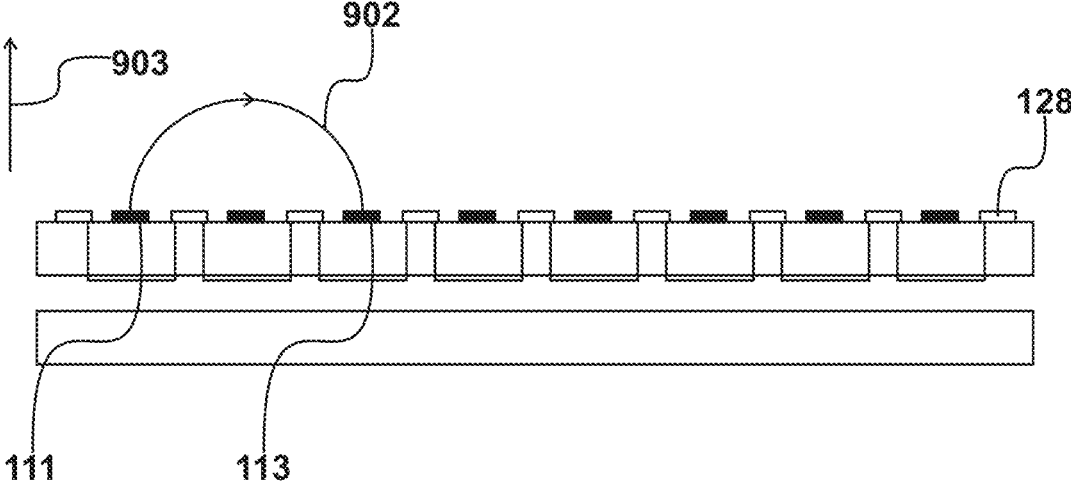
FIG. 11 shows a second energization of the first electrode.

The energizing of the selected electrode 111 for a second time is illustrated in FIG. 11. The sequential monitoring of the remaining electrodes may result in any of the remaining electrodes being monitored and it is not necessary for this sequential operation to be performed in any particular order. However, for the purposes of providing an example, in this embodiment, when the second energizing operation of the first electrode 111 takes place, the third electrode 113 is monitored, resulting in the generation of a second electric field 902. As can be seen in FIG. 11, the second electric field 902 exhibits greater penetration, that is in the direction of arrow 903, compared to the penetration achieved by the first electric field 811.

In an embodiment, only two sequential monitoring operations are performed. However, in alternative embodiments, further sequential monitoring operations may be performed to achieve a greater level of penetration.

FIG. 12

Figure 12:
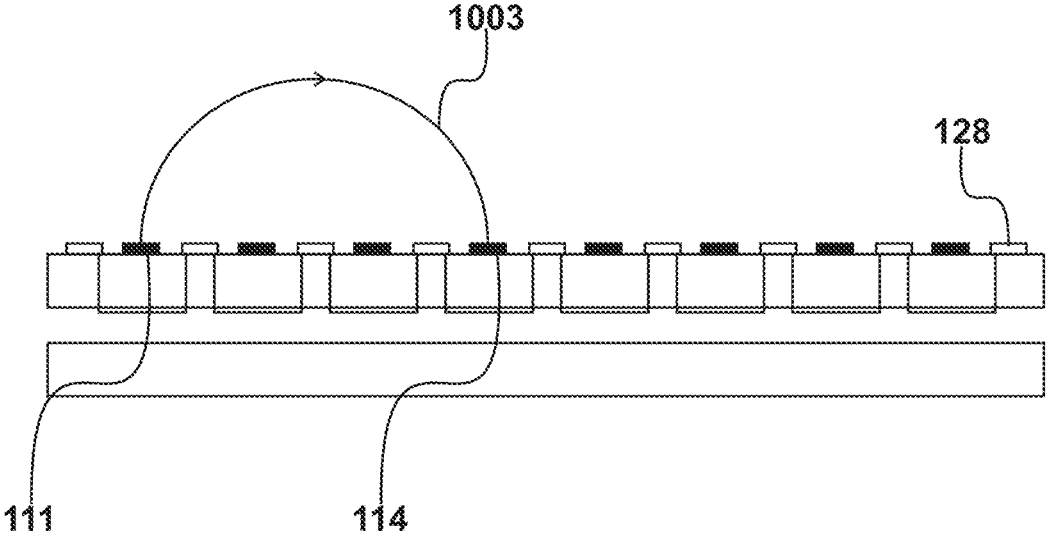
FIG. 12 shows a third energization of the first electrode.
Figure 13:
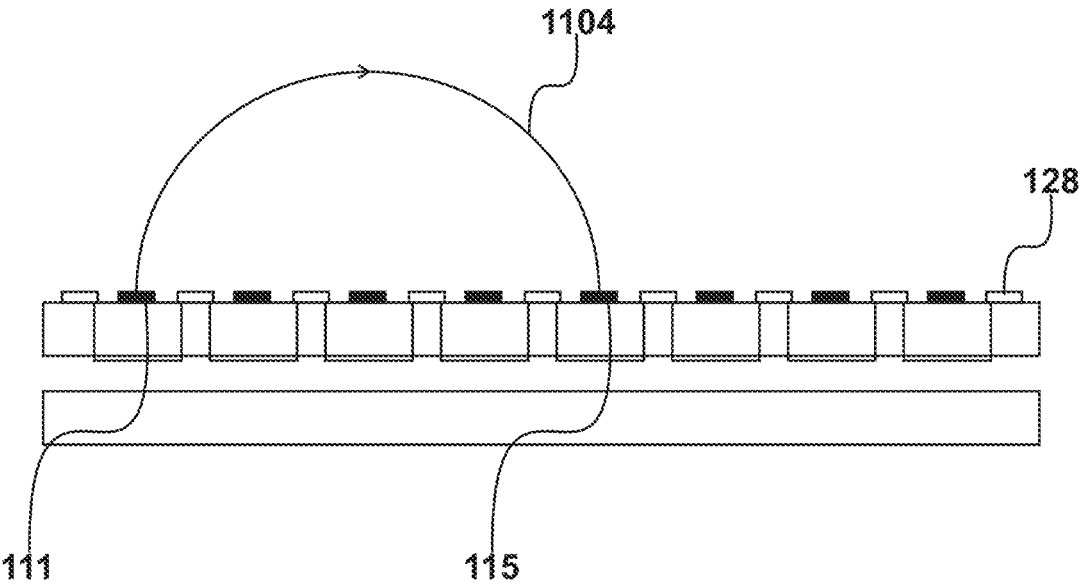
FIG. 13 shows a fourth energization of the first electrode.
Figure 14:
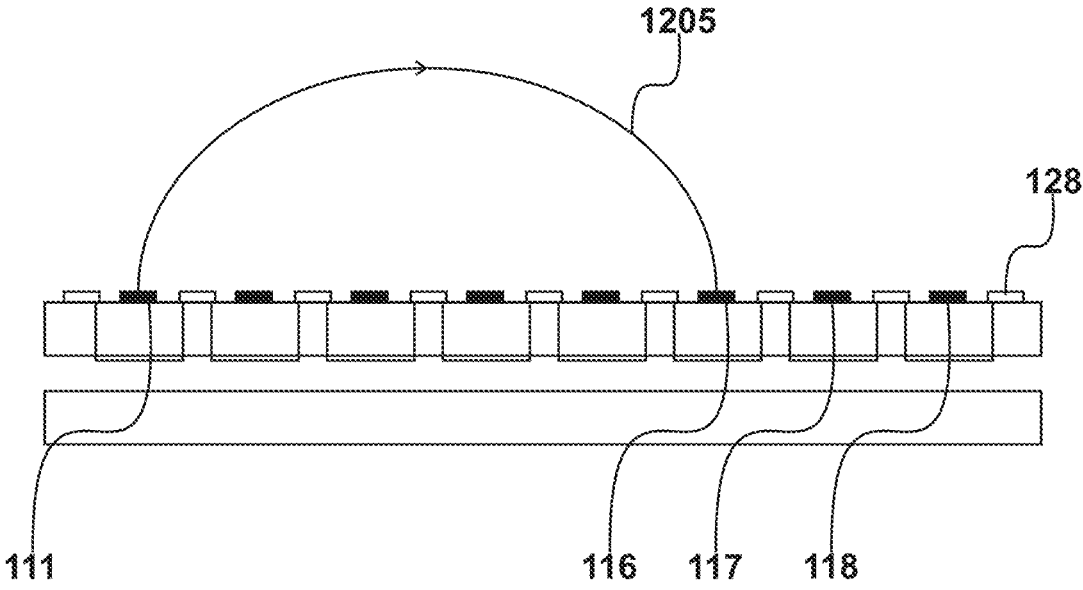
FIG. 14 shows a fifth energization of the first electrode.

In this example, a third remaining electrode is monitored, as shown in FIG. 12, a fourth remaining electrode is monitored as shown in FIG. 13 and a fifth remaining electrode is monitored as shown in FIG. 14, thereby providing greater levels of penetration. Thus, in this example, the selected electrode 111 is energized a third time and the fourth electrode 114 is monitored resulting in a third electric field 1003.

Again, with a greater displacement between the energized electrode 111 and the monitored electrode 114, the resulting third electric field 1003 achieves a greater level of penetration compared to the level of penetration achieved by the second electric field 902.

FIG. 13

As illustrated in FIG. 13, the selected electrode 111 is energized again and the fifth electrode 115 of the remaining electrodes is monitored. This results in the generation of a fourth electric field 1104 which again achieves a greater level of penetration compared to the level of penetration achieved by the third electric field 1003.

FIG. 14

In this embodiment, as illustrated in FIG. 14, the selected electrode 111 is energized again and the sixth electrode 116 of the remaining eleven electrodes is monitored. This results in the generation of a fifth electric field 1205. Again, given the greater displacement between the first electrode 111 and the sixth electrode 116, the level of penetration achieved by the fifth electric field 1205 is greater than the level of penetration achieved by the fourth electric field 1104.

This process could continue with the seventh electrode 117 and the eighth electrode 118 being sequentially monitored.

FIG. 15

Figure 15:
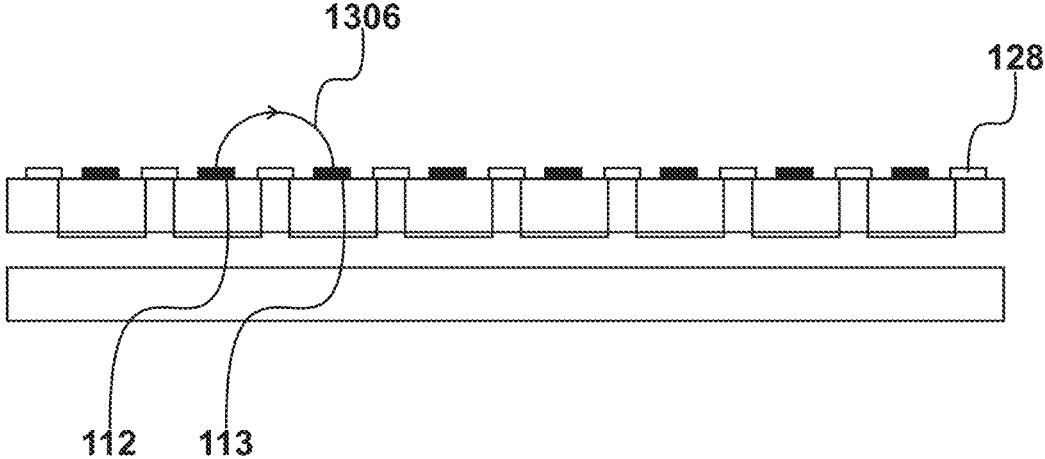
FIG. 15 shows energization of a second electrode while the third electrode is monitored.

In an embodiment, it is possible for one electrode to be energized on each cycle with a plurality of electrodes being monitored to achieve the required degree of layering. However, in an alternative embodiment, as illustrated in FIG. 15, a plurality of electrodes of the first set are selected and sequentially energized. Thus, in this embodiment, the second electrode 112 of the first set is selected and two or more of the remaining electrodes are then monitored. As shown in FIG. 15, the second electrode 112 is energized and the third electrode 113 is monitored to produce a sixth electric field

1306. The sixth electric field 1306 achieves a degree of penetration that is substantially similar to that achieved by the first electric field 811. However, the position of the sixth electric field has been displaced to the right compared to the position of the first electric field 811.

Again, the selected electrode is energized two or more times while sequentially monitoring two or more of the remaining electrodes to achieve higher degrees of penetration.

FIG. 16

Figure 16:
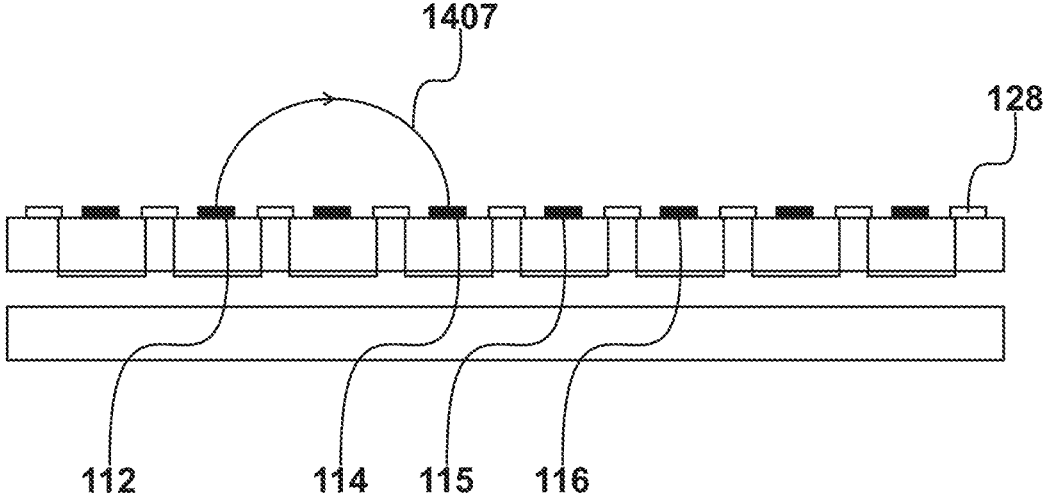
FIG. 16 shows a second energization of the second electrode.

In FIG. 16, to achieve these higher degrees of penetration, the second electrode 112 has again been energized but the fourth electrode 114 is monitored, resulting in the generation of a seventh electric field 1407. In an embodiment, further energizations of the selected electrode take place with sequential monitoring of the fifth electrode 115 followed by the sixth electrode 116.

FIG. 17

Figure 17:
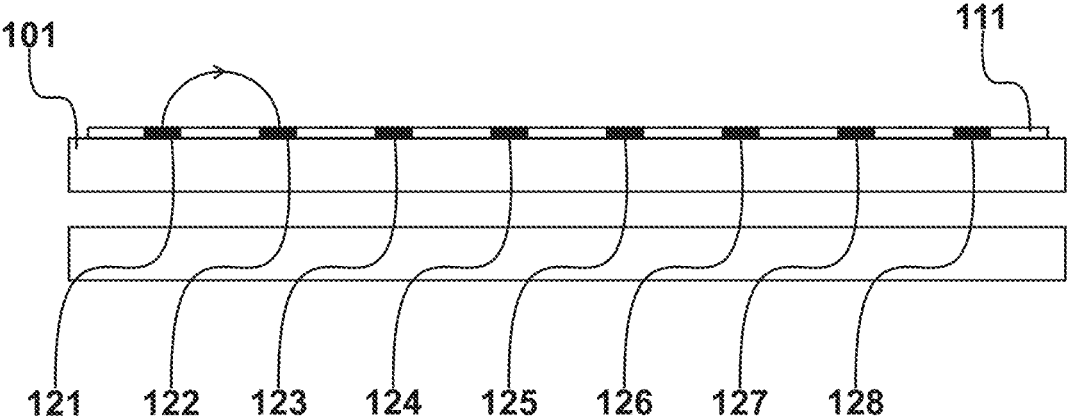
FIG. 17 shows an alternative end view of the dielectric substrate and an energization of a first electrode of a second set of substantially parallel electrodes.
Figure 18:
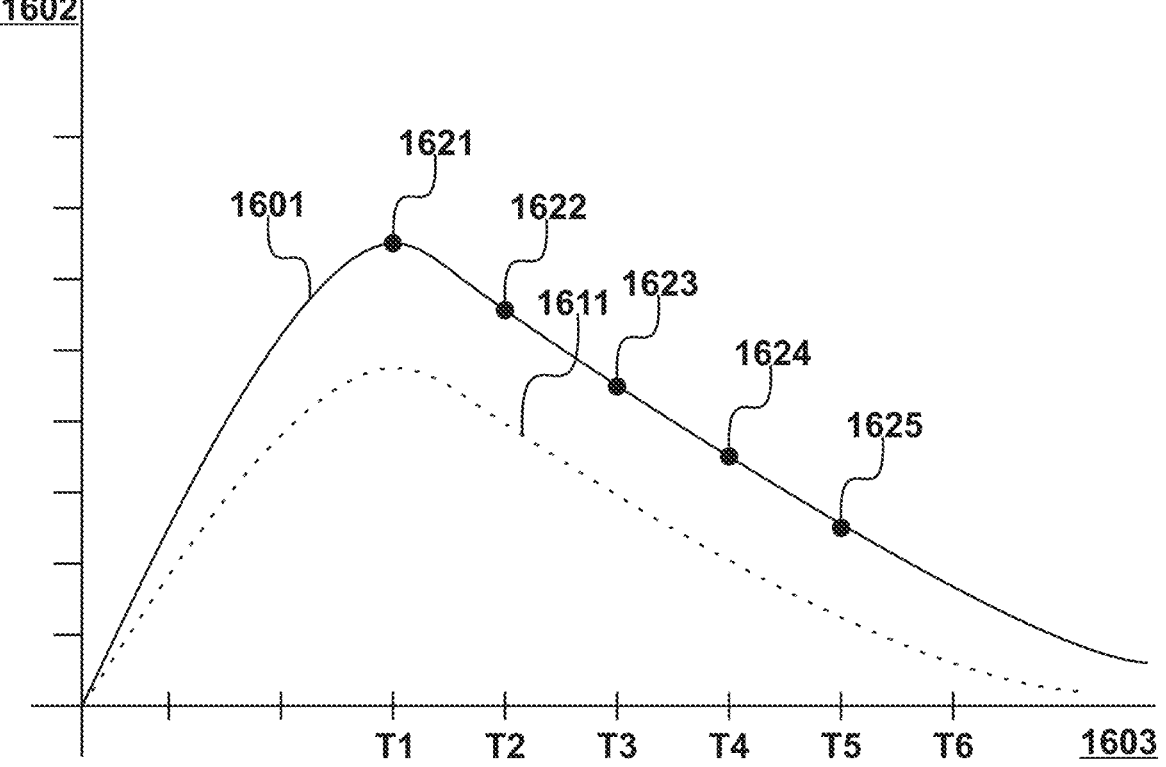
FIG. 18 shows an example of an output signal derived from a monitored electrode.

After completing the selection of electrodes of the first set of substantially parallel electrodes 111 to 118, electrodes of the second set 121 to 128 are selected. The dielectric substrate 101 is shown in FIG. 17 when viewed in the direction of arrow 1500 identified in FIG. 3. Thus, a selected electrode of the second set is energized two or more times and two or more remaining electrodes of the second set are sequentially monitored. The procedures performed with respect to the second set of substantially parallel electrodes is therefore substantially similar to that described with reference to FIG. 10 to FIG. 16. Thus, for the purposes of illustration, as shown in FIG. 17, the first electrode 121 is energized and the second electrode 122 is monitored. This is then followed with the first electrode 121 being energized again and the third electrode 123 being monitored and so on to complete the cycle.

FIG. 18

An example of an output signal 1601 derived from a monitored electrode is graphically represented in FIG. 10, in which output voltage 1602 is plotted against time 1603. The output signal 801 has been derived from the first array of continuous electrodes 111 to 118.

When a similar position is monitored by the second set of discontinuous electrodes 121 to 128, a similar response 1601 is achieved. In the earlier known configuration of electrodes, described with reference to FIG. 1 and FIG. 2, a similar output signal derived from the second set of electrodes would be attenuated, as illustrated by a notional response 1611.

To provide the first data stored at step 706 and the second data stored at step 708, multiple samples of the monitored output signal are digitized. Thus, in an embodiment, the processing system 602 includes an analog-to-digital converter which, for each monitored output signal, produces a first sample 1621 at time T1, a second sample 1622 at time T2, a third sample 1623 at time T3, a fourth sample 1624 at time T4 and a fifth sample 1625 at time T5.

The invention claimed is:

1. An apparatus for deploying electric fields to determine electrical characteristics of an object, comprising: a dielectric substrate having a first surface and a second surface; a first set of parallel electrodes on said dielectric substrate;

a second set of substantially parallel electrodes also on said dielectric substrate, wherein said second set of parallel electrodes is orthogonal to said first set of parallel electrodes;

first devices for energizing a selected electrode of said first set of parallel electrodes two or more times and sequentially monitoring two or more remaining electrodes of said first set of parallel electrodes; and second devices for sequentially energizing a selected electrode of said second set of parallel electrodes two or more times and sequentially monitoring two or more remaining electrodes of said second set of parallel electrodes;

wherein: said first set of parallel electrodes are mounted on said first surface of said dielectric substrate;

said second set of parallel electrodes are also mounted on said first surface, thereby defining electrode crossings;

discontinuities are formed in an electrode at each said electrode crossing to electrically isolate electrodes of said first set of parallel electrodes from electrodes of said second set of parallel electrodes; and an electric bridge is created at each said discontinuity, that extends away from a plane of said first surface, to maintain electrical conductivity.

2. The apparatus of claim 1, wherein said dielectric substrate is a board and said electrodes of said first set of parallel electrodes and said electrodes of said second set of parallel electrodes are established on said board by an etching process.

3. The apparatus of claim 1, wherein said dielectric substrate is flexible.

4. The apparatus of claim 1, wherein each said electric bridge is a wire that physically passes over a continuous electrode at an electrode crossing.

5. The apparatus of claim 1, wherein:

each said electric bridge is formed by a respective bridge conductor on said second surface; and electrical contacts pass through said dielectric substrate, each connecting an end of a discontinuous electrode to an end of a bridge conductor.

6. The apparatus of claim 1, wherein all of said electrodes of said first set of parallel electrodes are continuous, such that all of said discontinuities are present in said second set of parallel electrodes.

7. A method of deploying electric fields to determine electrical characteristics of an object, in which:

a dielectric substrate has a first surface and a second surface;

a first set of parallel electrodes are located on said first surface;

a second set of parallel electrodes are also located on said first surface, wherein said second set of parallel electrodes is orthogonal to said first set of parallel electrodes thereby defining electrode crossings;

discontinuities are formed in an electrode at each said electrode crossing to electrically isolate electrodes of said first set of parallel electrodes from electrodes of said second set of parallel electrodes; and an electric bridge is created at each said discontinuity, that extends away from a plane of said first surface, to maintain electrical continuity, the method comprising the steps of:

energizing a selected electrode of said first set of parallel electrodes two or more times and sequentially monitoring two or more remaining electrodes of said first set of parallel electrodes; and energizing a selected electrode of said second set of parallel electrodes two or more times and sequentially monitoring two or more remaining electrodes of said second set of parallel electrodes.

8. The apparatus of claim 7, wherein each electrode of said first set of parallel electrodes and said second set of parallel electrodes has a normal width defining a track footprint on said dielectric substrate; and each continuous electrode has a reduced width at each electrode crossing to reveal an uncovered region of said track footprint.

9. The apparatus of claim 8, wherein an end of a discontinuous electrode extends into one of said uncovered regions of a track footprint.

10. The apparatus of claim 9, wherein said reduced width defines uncovered regions of track footprints with trapezoidal shapes.

11. The apparatus of claim 10, wherein said end of said discontinuous electrode has a trapezoidal shape.

12. The method of claim 7, wherein said dielectric substrate is a board, the method further comprising the step of etching said board to establish said electrodes of said first set of parallel electrodes and said electrodes of said second set of parallel electrodes.

13. The method of claim 7, wherein said dielectric substrate is flexible.

14. The method of claim 7, further comprising the step of passing a wire over a continuous electrode at an electrode crossing to form a said electric bridge.

15. The method of claim 7, further comprising the steps of:

etching bridge conductors on said second surface of said dielectric substrate; and passing an electrical contact through said dielectric substrate to connect an end of discontinuous electrodes to an end of a said bridge conductor.

16. The method of claim 7, wherein a plurality of electrodes of said first set of parallel electrodes are selected and sequentially energized.

17. The method of claim 16, wherein a plurality of remaining electrodes of said first set of parallel electrodes are sequentially monitored in response to respective energizations of an additional energizing electrode, to produce respective output signals.

18. The method of claim 7, wherein a plurality of electrodes of said second set of parallel electrodes are sequentially selected and energized.

19. The method of claim 18, wherein a plurality of remaining electrodes of said second set of parallel electrodes are monitored in response to respective energizations of an additional energizing electrode, to produce respective output signals.

20. The method of claim 7, further comprising the steps of:

sampling monitored output signals a plurality of times; and digitizing each resulting sample.

* * * * *